United States Patent Office 3,547,972
Patented Dec. 15, 1970

3,547,972
ADDITION OF HYDROGEN CYANIDE
TO BUTADIENE
William C. Drinkard, Jr., Wilmington, Del., assignor to
E. I. du Pont de Nemours and Company, Wilmington,
Del., a corporation of Delaware
No Drawing. Filed Apr. 1, 1968, Ser. No. 717,947
Int. Cl. C07c 121/04
U.S. Cl. 260—465.3                                    4 Claims

ABSTRACT OF THE DISCLOSURE

Hydrogen cyanide can be added to butadiene in the presence of a hydrogen halide to give high yields of 3-pentenenitrile and 4-pentenenitrile, together with small amounts of isomeric pentenenitriles by use of a catalyst of copper chromite or activated copper chromite. The pentenenitriles can be converted to adiponitrile, which is an intermediate for the production of polyamides.

FIELD OF THE INVENTION

This invention relates to a process of preparing pentenenitriles. More particularly this invention relates to a process of catalytically adding hydrogen cyanide to butadiene to form pentenenitriles.

DEFINITION OF THE INVENTION

The process of the present invention can be defined as a process for manufacturing pentenenitriles which comprises contacting a mixture containing hydrogen cyanide, butadiene and a hydrogen halide wherein the halogen has an atomic number from 17 to 53 with a catalyst containing copper chromite at a temperature of 150° C. to 450° C. and recovering pentenenitriles from the reaction product.

DETAILED DESCRIPTION OF THE INVENTION

The copper chromite catalysts useful in the process of the present invention are conventional copper chromite or activated copper chromite catalysts which are well known in the art. These catalysts can be represented by the formula:

$[CuCr_2O_4 \cdot xCuO \cdot ]y[M_nCr_2O_4 \cdot zM_nO]m[M'CrO_4wM'O]$ wherein M is a metal which can be Ag, Cd, Zn, Bi, Ni(II), or Mn(II); M' is Mg, Ca, Sr or Ba;

$n$ is $\dfrac{2}{\text{valence of } M}$ i.e., $n=1$ for the above metals except silver, when $n=2$, $x$, $z$ and $w$ are from 0.1 to 10 and generally 0.5 to 3, and $y$ and $m$ are 0 to 10, preferably 0.2 to 2.

The "promoted" catalysts (where $y$ and/or $m>0$) are preferred.

The catalysts are prepared by thermal decomposition of basic double ammonium chromates, which are readily formed in aqueous medium from metal (M″) nitrates or sulfates, ammonium chromate and excess ammonia. The basic double ammonium chromates are formed as precipitates, are washed free of soluble ammonium salts, and then calcined at 300–600° C. The following equations show the chemistry of their preparation from metal nitrates:

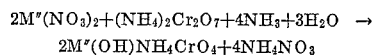

2M″(OH)NH₄CrO₄+4NH₄NO₃

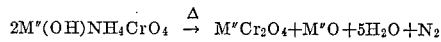

After calcination the solid metal chromite/oxide mixtures are powdered and may be used in the powdered form in fluidized catalyst beds, or can be pelleted into granules which may be used in fixed beds. The preparation of metal chromites is described more fully by Mellow, "Inorganic and Theoretical Chemistry," vol. XI, pp. 196–204, and by Adkins, "Reactions of Hydrogen with Organic Compounds over Copper-Chromium Oxide and Nickel Catalysts," University of Wisconsin Press, Madison, Wis., 1937, chapter II.

Hydrocynation of butadiene in the vapor phase over a copper chromite catalyst in the presence of a hydrogen halide (other than hydrogen fluoride) can be carried out at temperatures in the range 150–450° C., the preferred range being 150–350° C. The pressure at which the reaction is carried out is not critical and can range from below atmospheric pressure to at least 40 atmospheres, although a pressure of one atmosphere or slightly above is preferred. Likewise the time of reaction (i.e., time of contact of the gaseous reactants and the catalyst), which will vary in the normal way with temperature and pressure, is not critical and is generally selected for convenience and efficiency of operation.

The proportion of butadiene and hydrogen cyanide in the process is preferably from about 10:1 to about 1:10 in butadiene:HCN molar (gas volume) ratio, the most preferred ratio being 1:1. An excess of butadiene is undesirable because it can undergo a side reaction to form vinylcyclohexene under the conditions of the process. The amount of hydrogen halide in the butadiene gas stream is preferably from about 1:50 to 1:1 in HCl:butadiene volume ratio, the most preferred ratio being about 1:10. An inert carrier gas such as nitrogen or helium can be used but is not necessary.

The addition of HCN to butadiene can result in the following products: cis and trans 2-methyl-2-butenenitrile (2M2BN), 2-methyl-3-butenenitrile (2M3BN); cis and trans 2-pentenenitrile (2PN), cis and trans 3-pentenenitrile (3PN) and 4-pentenenitrile (4PN). Of these products, 3PN and 4PN are particularly valuable since they can be converted directly to adiponitrile, a valuable nylon intermediate, by such processes as those disclosed by W. C. Drinkard, Jr. in U.S. application Ser. No. 697,564, filed Oct. 31, 1967. Thus 3- and 4-pentenenitriles can be reacted with hydrogen cyanide in the presence of a catalyst of zero-valent nickel complexed with a trihydrocarbyl phosphine and an alkali metal borohydride at a temperature between −25 and 200° C., to yield adiponitrile.

This invention is further illustrated by the following specific examples, which are not, however intended to fully delineate the scope of the present discovery.

EXAMPLES 1–3

Vapor phase hydrocyanations of butadiene were carried out in a vertical Pyrex glass column 18″ long by 1.5 cm. diameter and heated by a 12″ heating band. A 6 mm. O.D. thermowell extended to the bottom of the catalyst section and contained a thermocouple positioned at the midpoint of catalyst depth, which was 9 inches overall, centered inside the heating band. Catalyst was supported by a fritted glass disk at the bottom of the catalyst section. Fitted to the top of the reactor column by a 28/15 glass join was a head containing a gas inlet tube for nitrogen purge or reagent feed and a safety blowoff through a pool of mercury set for a maximum pressure of ½-atmosphere above room pressure. Fritted to the bottom of the column by a 19/22 glass joint was a water cooled condenser and vented flask for condensation and collection of liquid product.

The reagent gases were mixed before being fed to the reactor column. A slow stream of nitrogen carrier gas was bubbled through liquid hydrogen cyanide at 25° C. and then mixed with the butadiene-hydrogen chloride mixture, which entered by means of a T-joint. Hydrogen chloride gas was introduced into the butadiene stream via a hypodermic needle inserted through the wall of the rubber delivery tube attached to the butadiene source. Individual flow rates were observed and regulated by bubble rates in appropriately located small traps containing inert liquid.

The reactor column was charged with 45 ml. of catalyst and the equipment assembled as described above. The system was purged with nitrogen and the catalyst heated to about 200° C. (200±15) as measured at the mid-point of catalyst depth. A mixture of nitrogen, butadiene, hydrogen cyanide and hydrogen chloride (volume ratio 1:1:1:0.1) was then passed over the catalyst. Temperature changes were observed and the run was terminated when there was evidence of cessation of exothermic reaction. Liquid product collected at 25° C. was analyzed by gas chromatography with a chromatographic column previously calibrated for analysis of mixtures of 2-methyl-2-butenenitrile, 2-methyl-3-butenenitrile, 2-pentenenitrile, 3-pentenenitrile, and 4-pentenenitrile.

Table I summarizes the results obtained with various copper chromite catalysts, using the procedure described above.

The catalysts used in the foregoing examples were prepared by the following procedures.

of 2 g. per minute. A sample of the supernatant liquid was tested with aqueous ammonia and the mixture became cloudy. More gaseous $NH_3$ was added to the reaction mixture until a test with aqueous ammonia showed that precipitation was complete. The precipitate was filtered, washed and dried at 150° C., then calcined at 450° C. for 3 hours. A 100 g. portion of the calcined powder was kneaded into a paste with a solution comprising 30 cc. of $H_2O$, 2.71 g. of $CrO_3$ and 1.1 g. of MgO. The paste was dried at 150° C., crushed and screened to 100% through a 10 mesh screen, mixed with graphite (1%), and pressed into 3/16" long by 3/16" diameter pellets. The pellets were finally calcined at 600° C. for 3 hours. The composition was $[CuCr_2O_4 \cdot CuO]0.172[MgCrO_4 MgO]$.

EXAMPLE 3

Copper-nickel-zinc-barium chromite

This catalyst was prepared as described by Reeves and Adkins, J. Am. Chem. Soc. 62, 2874 (1940). The composition was $[CuCr_2O_4 \cdot CuO][NiCr_2O_4 \cdot NiO][ZnCr_2O_4 \cdot ZnO]$
$0.33[BaCrO_4 \cdot BaO]$ As many apparently widely different embodiments of this invention may be made without departing from the

TABLE I

| | Chromite catalyst | Temp., °C. | Time, min. | Product vol., ml. | 2M2BN Cis | 2M2BN Trans | 2M3BN/c-2PN | t-2PN | 3PN Cis | 3PN Trans | 4PN |
|---|---|---|---|---|---|---|---|---|---|---|---|
| Example: | | | | | | | | | | | |
| 1 | Cu-Zn | 213–339 | 45 | 25 | 4.2 | 2.2 | 11.4 | 2.5 | 16.9 | 41.7 | 11.0 |
| 2 | Cu-Mg | 208–220 | 55 | 3 | | | 8.5 | | 11.1 | 70.9 | |
| 3 | Cu-Ni-Zn-Ba | 194–312 | 44 | 5 | 1.4 | | 8.5 | 1.7 | 12.2 | 56.1 | 4.8 |

NOTES:
(1) The crude products also contained minor proportions of benzene and vinylcyclohexene.
(2) 2M3BN and cis-2PN are not separated by the gas chromatographic column used in these analyses.

EXAMPLE 1

Copper-magnesium chromite

Gaseous $NH_3$ (165 grams) was introduced at a rate of 3.5 g. per minute into a stirred aqueous solution containing 570 g. of $ZnSO_4 \cdot 5H_2O$, 283 g. of $CuSO_4 \cdot 5H_2O$ and 355 g. of $CrO_3$ in a total volume of 6 liters at 38° C. When precipitation was complete, agitation was stopped and the precipitate was washed with distilled water by repeated decantations to remove sulfate ions. When the concentration of sulfate ions in the supernatant liquid was reduced ot less than 2% by analysis, the clear liquid was decanted to the lowest level possible without loss of precipitate. The precipitate was then redissolved in the remaining water by adding 550 grams of $CrO_3$ gradually with stirring. The solution was diluted to 6 liters at 38° C., and gaseous $NH_3$ again added with stirring as before to effect complete reprecipitation. The precipitate was again washed by decantation until the sulfate content of the mother liquor was less than 10 p.p.m. The sulfate-free precipitate was filtered, dried and calcined at 480° C. for 2 hours. The calcined solid was densified by compression as a wet paste in a heavy duty kneader, and then was redried, crushed and screened to 100% through a 10 mesh screen. The resulting powder was mixed with graphite (1%) and formed into pellets 3/16" long by 3/16" diameter in a pilling machine. The pellets were finally calcined at 500° C. for 3 hours. The composition was $[CuCr_2O_4 \cdot CuO]2[ZnCr_2O_4 \cdot ZnO]$.

EXAMPLE 2

Copper-magnesium chromite $CrO_3$ (400 g.) was added gradually to a stirred solution of 752 g. of $Cu(NO_3)_2$ in 6 liters of water at room temperature. The resulting solution was adjusted to 30° C., and then 180 g. of gaseous $NH_3$ was added at the rate spirit and scope thereof, it is to be understood that this invention is not limited to the specific embodiments thereof except as defined in the appended claims.

The embodiments of this invention in which an exclusive property or privilege is claimed are defined as follows:

1. A process for the manufacture of pentenenitriles by addition of hydrogen cyanide to butadine which comprises contacting a mixture comprising hydrogen cyanide, butadiene and a hydrogen halide wherein the halogen has an atomic number of from 17 to 53 with a catalyst having the formula:

$[CuCr_2O_4 \cdot x \cdot CuO]M_nCr_2O_4 \cdot zM_nO]m[M'CrO_4 \cdot wM'O]$ wherein:

M is Ag, Cd, Zn, Bi, Ni(II) or Mn(II)
M' is Mg, Ca, Sr or Ba $n$ is $\dfrac{2}{\text{valence of M}}$ $x$, $z$ and $w$ are from 0.1 to 10; and
$m$ and $y$ are from 0 to 10 at a temperature of from 150 to 450° C.

2. The process of claim 1 in which said catalyst is copper zinc chromite.

3. The process of claim 1 in which said catalyst is copper magnesium chromite.

4. The process of claim 1 in which said catalyst is copper-nickel-zinc-barium chromite.

References Cited

UNITED STATES PATENTS 2,402,873    6/1946    Coffman et al. _____ 260—465.3

JOSEPH P. BRUST, Primary Examiner

U.S. Cl. X.R.

252—467, 468, 470; 260—666, 673.5

PO-1050
(5/69)

UNITED STATES PATENT OFFICE
CERTIFICATE OF CORRECTION

Patent No. 3,547,972      Dated December 15, 1970

Inventor(s) William C. Drinkard, Jr.

It is certified that error appears in the above-identified patent and that said Letters Patent are hereby corrected as shown below:

Column 2, line 2, "Mellow" should be -- Mellor --.

Column 2, line 61, "join" should be -- joint --.

Column 2, line 64, "Fritted" should be -- Fitted --.

Table I, Note (1), "vinylcycl9hexene" should be -- vinylcyclohexene --.

Column 4, line 44, "butadine" should be -- butadiene --.

Column 4, line 49, that portion of the formula "$-CuO]M_nCr_2O_4-$" should be -- $-CuO]y[M_nCr_2O_4-$ --.

Signed and sealed this 20th day of April 1971.

(SEAL)
Attest:

EDWARD M. FLETCHER, JR.      WILLIAM E. SCHUYLER, JR.
Attesting Officer      Commissioner of Patents